US011957111B2

(12) United States Patent
Meter

(10) Patent No.: US 11,957,111 B2
(45) Date of Patent: Apr. 16, 2024

(54) METHOD FOR HATCHING EGGS

(71) Applicant: SELEGGT GmbH, Cologne (DE)

(72) Inventor: Tjitze Meter, Veenendaal (NL)

(73) Assignee: SELEGGT GmbH, Cologne (DE)

( * ) Notice: Subject to any disclaimer, the term of this patent is extended or adjusted under 35 U.S.C. 154(b) by 485 days.

(21) Appl. No.: 16/628,045

(22) PCT Filed: Jul. 6, 2017

(86) PCT No.: PCT/EP2017/067031
§ 371 (c)(1),
(2) Date: Jan. 2, 2020

(87) PCT Pub. No.: WO2019/007521
PCT Pub. Date: Jan. 10, 2019

(65) Prior Publication Data
US 2021/0137080 A1 May 13, 2021

(51) Int. Cl.
*A01K 41/06* (2006.01)
*A01K 31/18* (2006.01)
*A01K 43/04* (2006.01)

(52) U.S. Cl.
CPC .......... *A01K 41/065* (2013.01); *A01K 31/18* (2013.01); *A01K 43/04* (2013.01)

(58) Field of Classification Search
CPC ...... A01K 41/065; A01K 43/00; A01K 43/04; A01K 31/18; A01K 31/16; A01K 31/165
See application file for complete search history.

(56) References Cited

U.S. PATENT DOCUMENTS

| 7,041,439 | B2* | 5/2006 | Phelps | G01N 1/34 435/235.1 |
| 7,861,673 | B2* | 1/2011 | Huisinga | A01K 45/005 119/311 |
| 10,091,974 | B2* | 10/2018 | Sewiolo | A61B 5/055 |
| 2003/0096319 | A1* | 5/2003 | Phelps | A01K 43/00 435/7.2 |

(Continued)

FOREIGN PATENT DOCUMENTS

| WO | 9814781 | 4/1998 | |
| WO | WO-2007018430 A1 * | 2/2007 | ............. A01K 41/00 |

(Continued)

OTHER PUBLICATIONS

Scott-Reid: 'A Scientist Has Figured Out How to Determine Chickens' Sex Before They Hatch—MUNCHIES', Apr. 8, 2015.
(Continued)

*Primary Examiner* — Monica L Perry
*Assistant Examiner* — Aaron M Rodziwicz
(74) *Attorney, Agent, or Firm* — N.V. Nederlandsch Octrooibureau

(57) ABSTRACT

A method for producing poultry at a hatchery includes
 incubating a batch of eggs in incubating trays in an incubating device during a first incubating period of between about 7 to about 11 days, and then,
 for each egg of the batch of eggs, determining of gender of the chick embryo, in particular after determination if the egg contains a well-developed or more specifically a living embryo, and
 based on the gender of a chick embryo, dividing the batch of eggs into at least a male batch portion and a female batch portion.

15 Claims, 4 Drawing Sheets

(56) References Cited

U.S. PATENT DOCUMENTS

Figure 4:
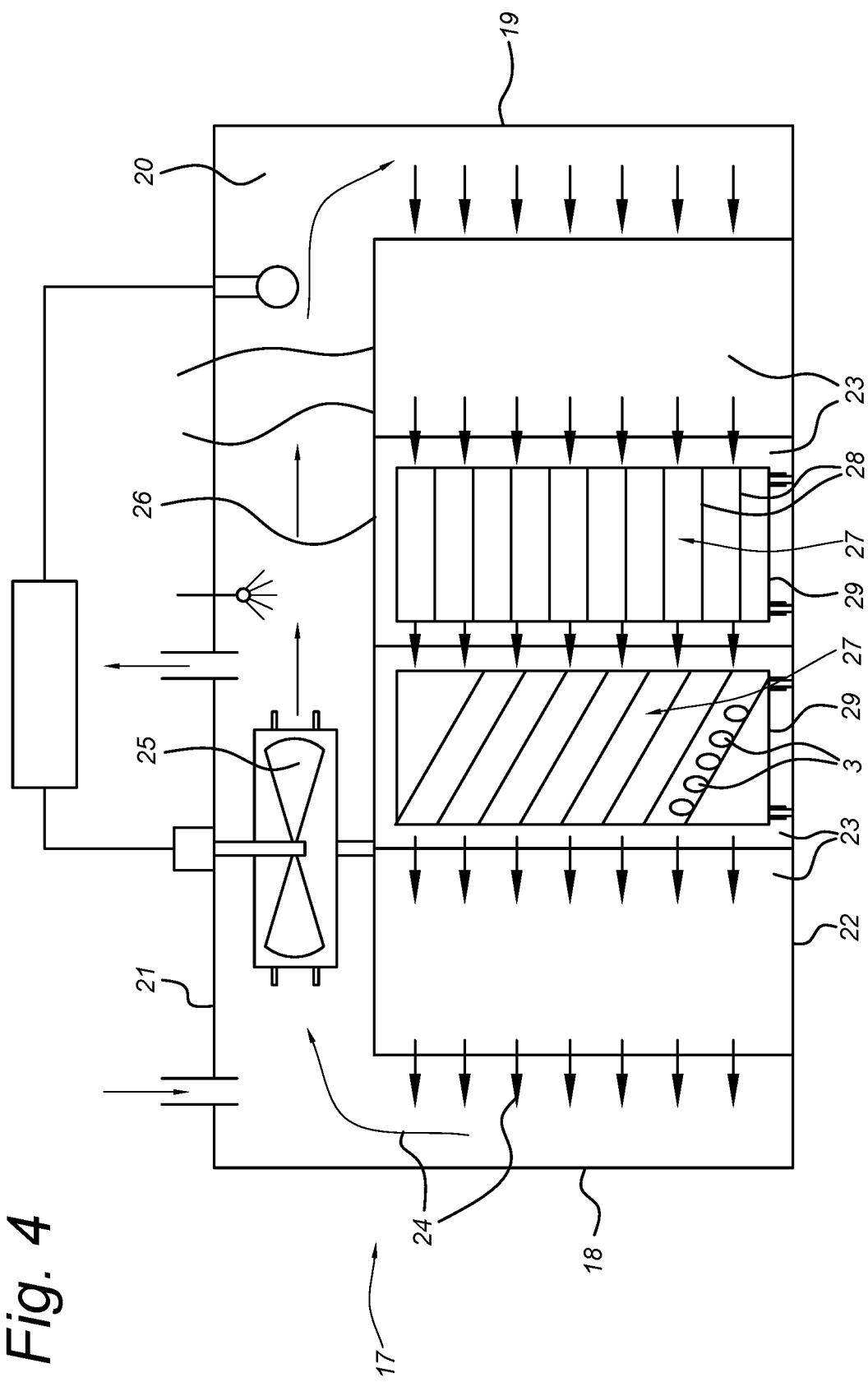

2007/0245973 A1* 10/2007 Huisinga ................ A01K 43/00
119/300

FOREIGN PATENT DOCUMENTS

| WO | WO-2011093607 A2 * | 8/2011 | ............. A01K 41/00 |
| WO | WO-2016039622 A1 * | 3/2016 | ............ A01K 31/002 |

OTHER PUBLICATIONS

Steiner et al.: 'Gender determination of fertilized unincubated chicken eggs by infrared spectroscopic imaging', Analytical and Bioanalytical Chemistry 400 (9), Apr. 9, 2011, pp. 2775-2782.

* cited by examiner

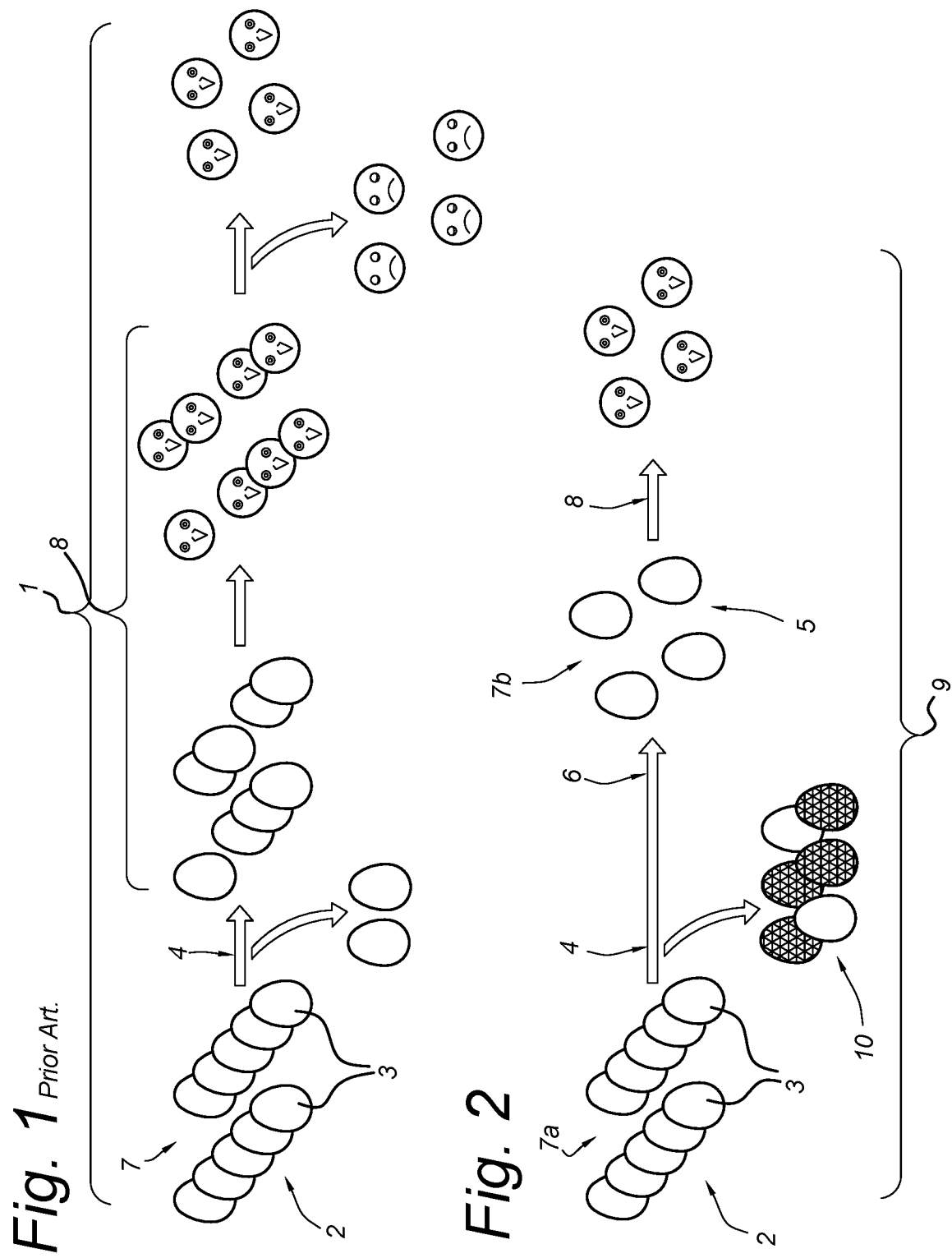

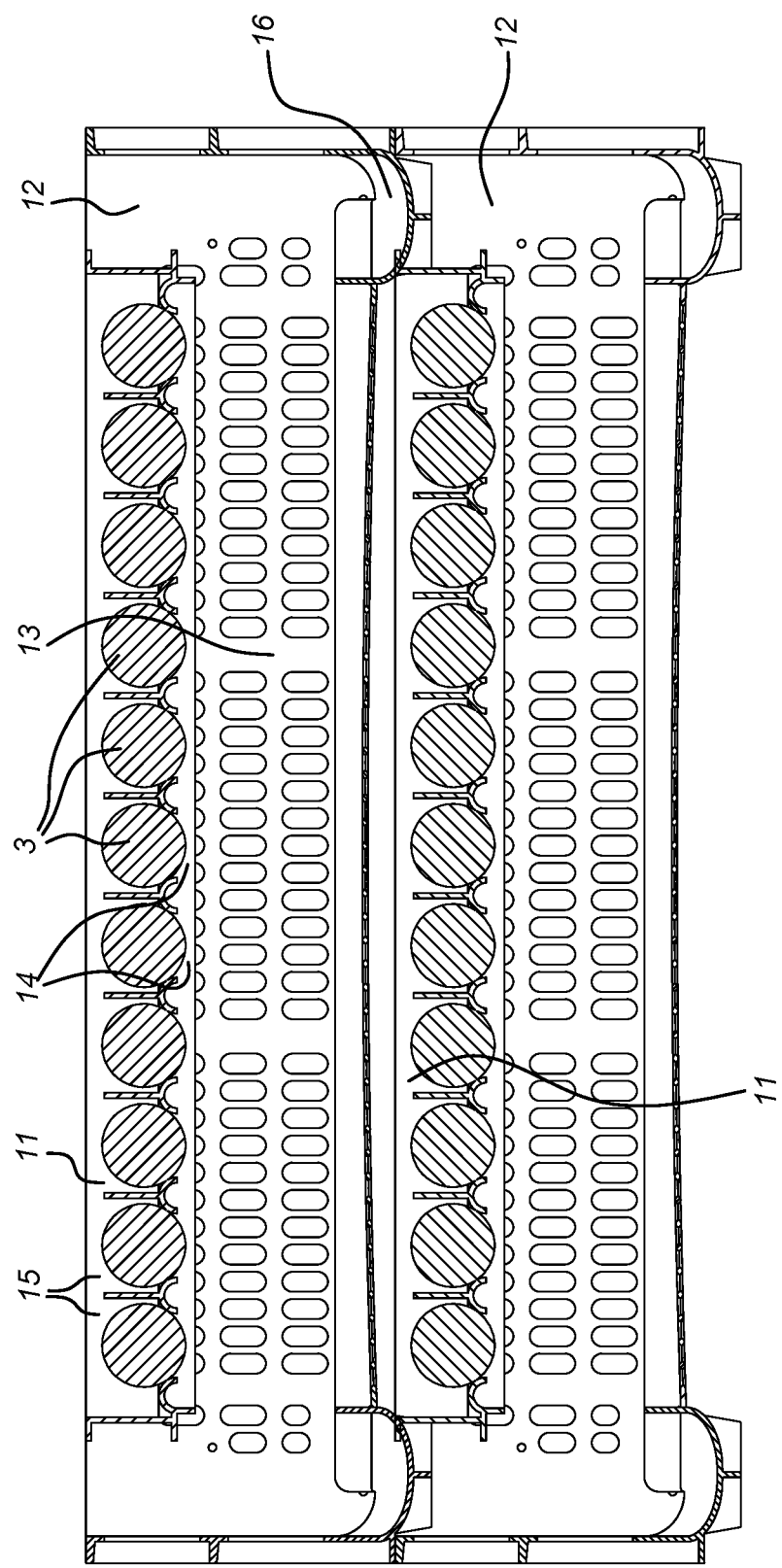

METHOD FOR HATCHING EGGS

FIELD OF THE INVENTION

The present invention relates to a method for producing chicks at a hatchery. The method includes incubating eggs in an incubating device and hatching eggs in an hatching device until hatching occurs.

BACKGROUND ART

It is generally known to incubate eggs in incubation devices, which substantially comprise a cabinet with climate control. The eggs that are to be incubated are placed in the cabinet. In general, during incubation the eggs are turned at regular intervals, inter alia in order to prevent the embryos from sticking to the membranes. After incubating, the eggs are placed in a second cabinet in order ultimately to be hatched therein, that is the chicks emerging from the egg. In commercial hatcheries, the first and second cabinets are different cabinets, therefore the eggs are transferred between the cabinets. Usually eggs are transferred by trolleys having a stack of trays holding eggs thereon. Transfer usually takes place on day 17 to 20 and is combined with assessments whether the egg contains a developed embryo, in order to only transfer hatcheable eggs to the second cabinet. Unhatcheable eggs are processed into products like shampoo.

In specific subsectors it is usual to manually separate hatched chicks according to their gender by observing visual characteristics (cloaca, feather, colour). Depending on the need for different genders one or both groups are brought to a farm. The 1 day old chicks that are not needed, that is not suitable for production, are killed.

This practice is subject of discussion in society because of moral and economical arguments.

WO2007142511 (A1) shows an example of an incubation device with trays that are periodically pivoted to turn the eggs.

There is a continuous need to improve filling grades of incubation devices and hatching devices in order to utilize the precisely climatized devices to the max. In situations were a part of the hatched chicks are not used for production, the incubation capacity is not being used efficiently.

It is known from WO2014126466 (A1) that offering early feeding to chicks is beneficial for the chicks health. In situations were a part of about 50% of the chicks is not being used for production, hatcheries are reluctant to offer early feeding to the just-hatched chicks because it would imply feeding the non-producing chicks as well.

SUMMARY OF THE INVENTION

The present invention has for its object to to improve the utilization of a hatchery.

The present invention has a further object to to improve a hatchery in that a problem with known hatcheries is at least partly solved.

Also, the present invention has for its object to provide an alternative hatchery.

Therefore, the present invention provides a method for producing poultry in, particular chicks, at a hatchery, the method comprising;

a) incubating a batch of eggs in incubating trays in an incubating device during a first incubating period of between about 7 to about 11 days, and then, b) for each egg of the batch of eggs, determining of gender of the chick embryo, in particular after determination if the egg contains a well-developed or more specifically a living embryo, c) based on the gender of a chick embryo, dividing the batch of eggs into at least a male batch portion and a female batch portion, d) redistributing at least one of the male batch portion and the female batch portion over incubating trays or hatching trays different from the said incubating tray, to end up with incubating or hatching trays filled with just one of the male batch portion and the female batch portion, e) incubating at least one of the female batch portion and the male batch portion in the incubating device during a second incubating period, and then f) moving the at least one of the female batch portion and the male batch portion from the incubating device to a hatching device and hatching the at least one of the female batch portion and the male batch portion in the hatching device until hatching occurs.

Dividing the incubating process, of normally in total about 18 days, in a first incubating period of between about 7 to about 11 days and a second incubating period, and determining gender of the chick embryos in between the first and second incubating period enables to improve the utilization of the hatchery. In particular the incubating device used during the second incubating period, as well as the hatching device can be better utilized. In other words, the advantage for existing hatcheries is that the total capacity is increased by about 25%. Put in a different way, a new hatchery to be build can have a smaller footprint.

Another benefit of the invention is that there is no need any more to kill healthy 1 d old chicks.

The eggs need to be redistributed over trays to end up with a tray holding eggs with embryos of one pre-defined gender that will result in for example in that the hatchery only hatches female chicks. It will be clear that after redistributing of eggs, that is the batch of eggs, trays are as much as possible completely filled with eggs.

The invention relates to producing poultry in general and in particular to producing chicken, turkeys and ducks but however is not limited to these examples. In the remainder of this application, reference is made to chicken.

It will be understood that the wording "for each egg of the batch" in step b) is used to make clear that a 100% determination of gender offers the most benefit. Since this invention relates to high numbers of eggs, "each egg" includes for example at least 98% of the eggs of the batch of eggs. It will also be clear that if unhatcheable eggs determined, these are removed from the batch of eggs before determining of gender.

In an embodiment, the method comprises step h) administering feed to hatched chicks in the hatching device. This is all the more beneficial, since the operator can be sure that the desired gender of chick is fed and food is optimally used. Also, no chicks that have been fed are killed and no 1 d old chicks are killed. It is noted that feed may already be administered while the eggs have not hatched yet. It is conceivable that the administering feed to hatched chicks in the hatching device involves offering of water and light to the newly hatched chicks.

In an embodiment of the method, during step e) the incubating device is configured for 100% capacity utilization. Known incubating devices are either not completely filled, or partly filled with eggs that are not hatcheable. In contrast, in the method according to the invention, the incubating device during the second incubating period can be 100% filled and as a consequence that incubating device is configured for 100% capacity utilization. In practice this can be advantageous for e.g. dimensions, cooling and heating capacity of the incubating device. When all eggs contain living embryo's, the cooling capacity needs to be configured accordingly since all the living eggs produce heat.

In an embodiment, the method comprises executing step a) in a first incubating device and step e) in a second incubating device different from the first. This facilitates all the more to configure the incubating devices in a different way like for example the first incubating device having about double the capacity in terms of number of eggs, compared to the second incubating device.

In an embodiment, the method comprises buffering at least a portion of the batch of eggs between step a) and step e) wherein a lead time between step a) and e) is predetermined, in particular the lead time between step a) and e) is about 24 hours. The predetermined lead time results in a better controllable incubating and hatching process.

In an embodiment, the method comprises after step c) placing the at least one of the female batch portion and the male batch portion in a hatching tray different from the said incubating tray and wherein step e) comprises incubating the at least one of the female batch portion and the male batch portion in the hatching tray. This facilitates transfer of eggs between the incubating device and hatching device. It is however of course still possible to transfer eggs individually from the incubating device to the hatching device if that is desired. Upon transfer, the presence of a hatchable chicks embryo can be detected. This detection can be done individually or by batch individually, that is in parallel. A hatching tray is different from an incubating tray like in that available space per egg can be different and a holding force exerted on an egg can be different.

In an embodiment of the method, the hatching tray is completely filled with the at least one of the female batch portion and the male batch portion.

In an embodiment, the method at least step c) involves processing of individual eggs and step f) comprises moving the hatching tray into the hatching device. This is optimal, because step c) requires individual handling anyway.

In an embodiment of the method, the hatching tray comprises a number of egg accommodation spaces in which space an egg is able to be hatched, and at least one passage for a chick through which passage a chick hatched from said egg may pass through the tray and enter a chick basket below the tray, and the method comprises forming an assembly of the tray arranged on the basket and step g) comprises administering feed to hatched chicks in the basket. This facilitates egg and chick handling all the more. Tray can be arranged on the basket in different ways like placing of sliding.

In an embodiment of the method, the assembly of the tray arranged on the basket comprises one or more of an chick accommodation space, an access to the chick accommodation space, a food trough. This facilitates the liveability for, and the offering of food to the chicks.

In an embodiment, the method comprises forming a stack of a number of assemblies of the tray arranged on the basket.

In an embodiment, the method comprises rearing the newly hatched chicks in the hatching device during an initial rearing period of between 0 to 4 days. This offers a good start to the newly hatched chicks.

In an embodiment, the method comprises for each egg of the batch, detecting the presence of a hatchable chick embryo. This even more enables to improve the utilization of the hatchery. In particular the incubating device used during the second incubating period, as well as the hatching device can be better utilized. Further, handling of a rotten egg and/or an egg without a living embryo is also avoided. Handling of such an egg may pollute the hatchery, in particular any equipment directly in contact with such an egg, and neighbouring eggs. Detecting the presence of a hatcheable chick embryo preferably precedes the determining of gender of the chick embryo. Unhatcheable eggs are removed from the batch of eggs before determining of gender of each egg of the batch of eggs.

In an embodiment of the method, the detecting the presence of a hatchable chick embryo comprises one or more of heartbeat detection with respect to an egg, candling of an egg, thermal imaging of an egg, colour measurement of an egg, weighing of an egg, detecting activity in an egg, sample analysis.

In an embodiment, the method comprises processing at least one of the female batch portion and the male batch portion into a high protein product, in particular food or feed. This enables to transform waste into useful feed.

In an embodiment, the method comprises at the hatchery processing the at least one of the female batch portion and the male batch portion into the high protein product and administering the high protein product to hatched chicks in the hatching device. This avoids unnecessary transport of eggs.

The invention therefore further provides a system for producing chicks, the system comprising a first incubating device and the second incubating device different from the first incubating device, wherein the capacity of the second incubating device is about half of the capacity of the first incubating device in particular less than half of the capacity of the first incubating device. Less than half of the capacity will suffice since male chicks and infertile eggs are removed. It will be clear that the first or second incubating device may comprises a number of units. What counts is the total installed capacity.

The invention therefore further provides a hatchery for producing chicks according to the aforementioned method, the hatchery comprising:
the aforementioned system for producing chicks,
a system for determining the gender of a chick embryo,
an egg handling system to redistribute at least one of the male batch portion and the female batch portion over incubating trays or hatching trays,
an hatching device for hatching the at least one of the male batch portion and the female batch portion, and in particular
a feeding system to administer feed in the hatching device.

SHORT DESCRIPTION OF DRAWINGS

Figure 5:
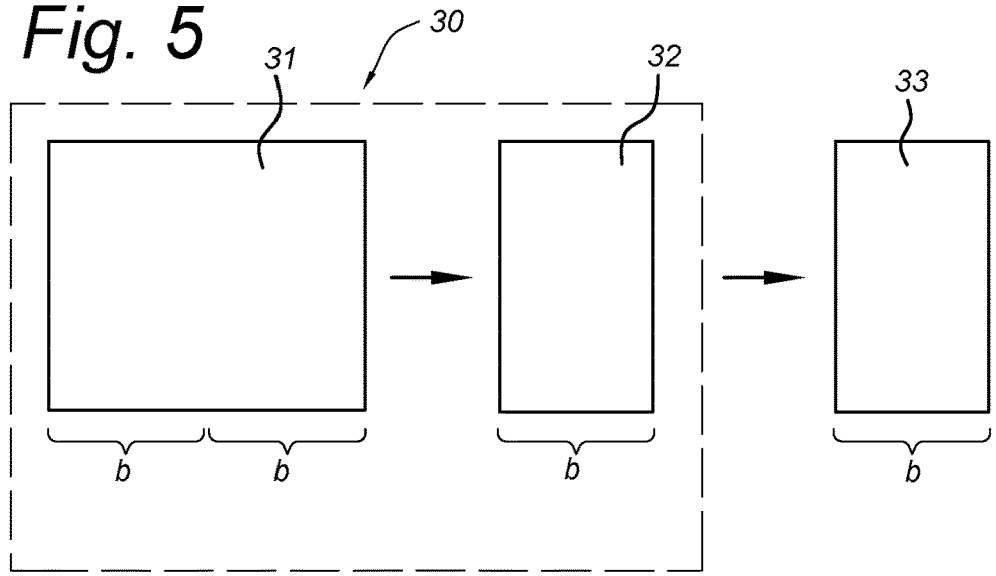
Figure 6:
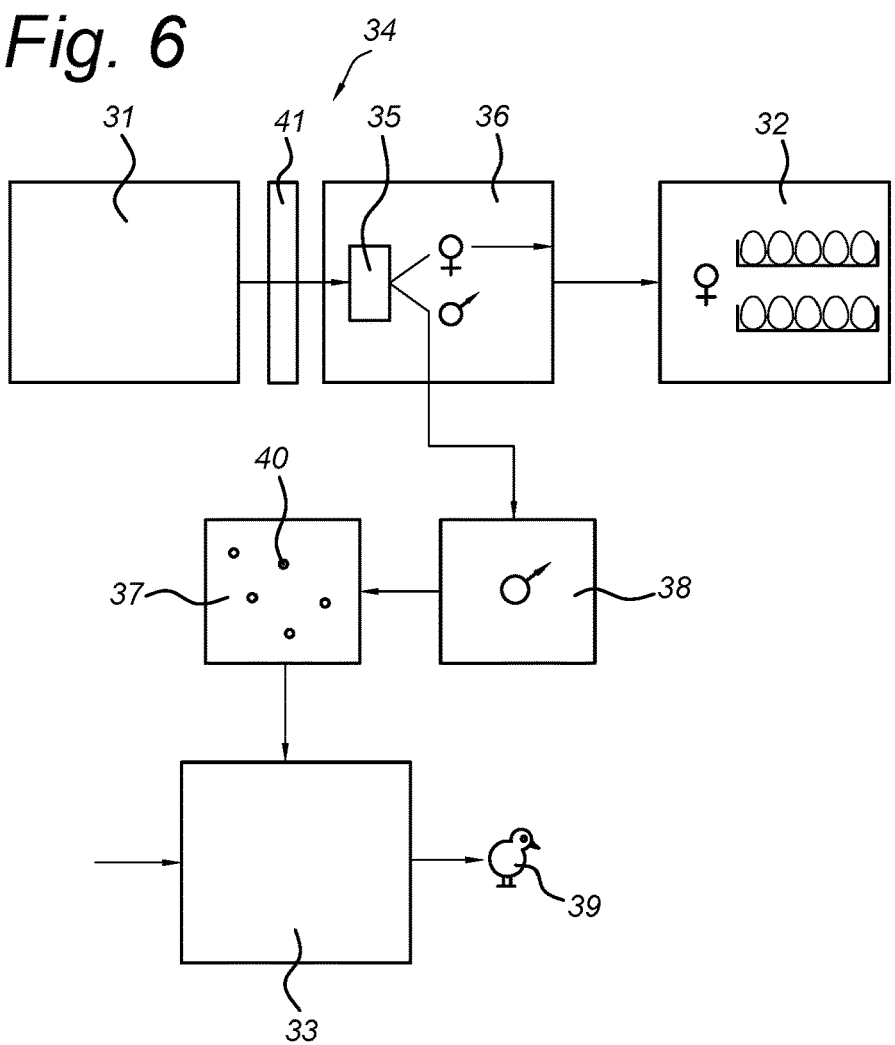

The present invention will be discussed in more detail below, with reference to the attached drawings, in which
FIG. 1 is a process flow in a hatchery according to the prior art.
FIG. 2 is a process flow 9 of a method for producing chicks in a hatchery according to the invention,
FIG. 3 shows a tray in assembly with a crate,
FIG. 4 is a schematic front view of an incubator,
FIG. 5 shows a system 1 for producing chicks, and
FIG. 6 schematically shows a hatchery for producing chicks.

DESCRIPTION OF EMBODIMENTS

FIG. 1 is a process flow 1 of a method for producing chicks in a hatchery according to the prior art. The input of the process is a batch 2 of eggs 3. The eggs 3 are hatching eggs starting incubation. In process step 7 the batch 2 of eggs is incubated for a period of normally 18 days. In step 4 for each egg 3 of the batch, the presence of a hatchable chick embryo is detected. These hatcheable eggs 3 are then hatched during step 8 in a hatching device until hatching occurs. During this step, trays and therefore the hatching device, are not optimally filled because the trays contain empty places and male embryo's/chicks. After hatching, the 1 day old male chicks are killed.

FIG. 2 is a process flow 9 of a method for producing chicks in a hatchery according to the invention The input of the process is a batch 2 of eggs 3. The eggs 3 are hatching eggs starting incubation. In process step 7*a* the batch 2 of eggs is incubated in incubating trays in an incubating device during a first incubating period of between about 7 to about 11 days. In the next step 6, for each egg 3 of the batch 2, the gender of the chick embryo is determined. As an option, the step 4 of detecting the presence of a hatchable chick embryo for each egg 3 of the batch is executed before or during step 6. Such a step 4 may comprise one or more of heartbeat detection with respect to an egg, candling of an egg, thermal imaging of an egg, colour measurement of an egg, weighing of an egg, detecting activity in an egg. After determining the gender, the batch 2 of eggs 3 is redistributed into a female batch portion 5 and a male batch portion 10. More precisely, here the batch portion 10 includes also unhatcheable eggs. In other words, based on the gender of a chick embryo, the batch of eggs is divided into at least a male batch portion and a female batch portion. The female batch portion 5 is placed in an incubating device during a second incubating period in step 7*b*. As a last shown step 8, the female batch portion 5 is hatched until hatching occurs. The newly hatched chicks stay in the hatching device during an initial rearing period of between 0 to 4 days.

After determining the gender, the batch 2 of eggs 3 is redistributed into a female batch portion 5 and a male batch portion 10 and optionally a non hatcheable portion. The eggs 3 are redistributed over incubating trays or hatching trays different from the said incubating tray. The redistribution results in incubating or hatching trays filled with just one of the male batch portion and the female batch portion. These hatcheable eggs 3 are then hatched during step 8 in a hatching device until hatching occurs.

Determining of gender involves processing of individual eggs. Moving the eggs into a hatching device involves moving the hatching tray into the hatching device. Thus a number of eggs are handled simultaneously.

The lead time between incubating step 7*a* and 7*b* is predetermined, in particular the lead time between is about 24 hours. Therefore, the process 9 comprising buffering at least a portion of the batch of eggs between incubating step 7*a* and 7*b*.

In the FIG. 3 a tray 11 is shown. The tray 11 is shown in assembly with a crate 12, also referred to as chick basket 12. Here, a stack of two assemblies of a crate 12 and a tray 11 is depicted. The crate 12 providing a chick accommodation space 13 for rearing chicks (not shown). The, here separate, tray 11 is arranged on top of the crate 12. The crate 12, also basket 12, has an open top such that a chick may enter the chick accommodation space 13 through a passage 14. The tray 11 contains a number of eggs 3. The tray 11 is for use in an hatching chamber which is not shown. The tray 11 comprises a number of egg accommodation spaces 15. The tray 11 is a hatching type of tray that leaves space at the egg to facilitate hatching of the chicks. The hatching tray 11 is different from an incubating tray as schematically shown in FIG. 4. The incubating of the female batch portion may be done in the hatching tray. This facilitates handling of the eggs downstream the process.

As shown, the hatching tray 11 is completely filled with eggs 3, here of the female batch portion. The hatching tray 11 comprises a number of egg accommodation spaces 13 in which space an egg is able to be hatched. The hatching tray 11 comprises at least one passage 14 for a chick through which passage a chick hatched from said egg may pass through the tray 11 and enter the chick basket 12 below the tray. The assembly of the tray arranged on the basket is formed by placement and or sliding. Feed can be administered to hatched chicks in the basket. Therefore, a trough 16 is provided with the basket 12.

The assembly of the tray arranged on the basket comprises a chick accommodation space 13 an access to the chick accommodation space 14 and a food trough 16.

FIG. 4 is a schematic front view of an incubating device 17. The outside of this incubating device 17 is delimited by two opposing lateral walls 18, 19, a rear wall 20, an opposing front wall, a ceiling 21 and a floor 22. In order to be able to regulate the temperature in the interior of the incubating device as accurately as possible, these walls, the floor and the ceiling will preferably be insulated in their configuration. The incubating device contains a compartment 26 through which temperature-controlled air is passed so as to be able to control in the compartment 26 the climatological conditions such as the temperature and/or humidity and/or composition of the air, etc. The air flow 24 is forced by a driven fan 25. In this example, the compartment 26 is divided into four sub compartments 23. However, more or fewer sub compartments 23 are also entirely possible. In each sub compartment 23 a stack 27 of incubating trays 28 are placed. The stack is placed on a trolley 29. The trays are incubating trays that hold the eggs 3 such that the eggs tilt with the tray.

FIG. 5 shows a system 30 for producing chicks. The system 30 comprises a first incubating device 31 and a second incubating device 32 in particular both like the incubating device 17 shown in FIG. 4. The second incubating device 32 is different from the first incubating device 31 in that the size is different. The depicted length of the first incubating device 31 is 2b while the length of the second incubating device 32 is b. It will be clear that the FIG. 5 is schematically and the difference in size is shown as an example. Thus, in other words, what counts is that the capacity in amount of eggs of the second incubating device 32 is about half of the capacity of the first incubating device 31.

As an option, the second incubating device 2 can be different from the first incubating device in that its configuration is different. In particular, the second incubating device 2 is configured for 100% capacity utilization. This means 100% fertile eggs whereas usually there is a number of infertile eggs like for example 5-20%. In particular the cooling system of the second incubating device 2 needs to be configured accordingly. The system 1 comprises a hatching device 33 downstream with respect to the second incubating device for hatching eggs until hatching occurs.

FIG. 6 schematically shows a hatchery for producing chicks. The hatchery comprises a system 30 described in FIG. 5. The hatchery comprises a system 35 for determining the gender of a chick embryo. The hatchery comprises an egg handling system 36 to redistribute at least one of the male batch portion and the female batch portion over incubating trays or hatching trays. As an option, the hatchery may comprises a feeding system 37 to administer feed in the hatching device 33. As a further option, the hatchery comprises a processing unit 38 to process at least one of the female batch portion and the male batch portion into a high protein product 40, in particular food or feed. This high protein product to can be administered to hatched chicks in the hatching device 33. As a further option the hatchery comprises a system 41 for detecting the presence of a hatchable chick embryo. The system 14 is upstream that is before the system 35 for determining the gender of a chick embryo. The system 41 comprises one or more of heartbeat detection with respect to an egg, candling of an egg, thermal imaging of an egg, colour measurement of an egg, weighing of an egg, detecting activity in an egg, sample analysis, that is a chemical analysis of the sample to determine hatcheability. In other words, system 41 determines if an egg contains a well-developed or more specifically a living embryo.

The present invention has been described above with reference to a number of exemplary embodiments as shown in the drawings. Modifications and alternative implementations of some parts or elements are possible, and are included in the scope of protection as defined in the appended claims.

The invention claimed is:

1. A method for producing poultry at a hatchery, the method comprising;
   a) incubating a batch of eggs in incubating trays in an incubating device during a first incubating period of between about 7 to about 11 days, and then,
   b) for each egg of the batch of eggs, detecting a presence of a hatchable chick embryo and then determining of gender of the chick embryo,
   c) based on the gender of a chick embryo and the presence of a hatchable chick embryo, dividing the batch of eggs into a hatchable male batch portion and a hatchable female batch portion,
   d) redistributing at least one of the hatchable male batch portion and the hatchable female batch portion over incubating trays or hatching trays different from the said incubating tray, to end up with incubating or hatching trays filled with just one of the hatchable male batch portion and the hatchable female batch portion,
   e) incubating one of the hatchable female batch portion and the hatchable male batch portion in the incubating device during a second incubating period and removing the other of the hatchable female batch portion and the hatchable male batch portion as well as the eggs without hatchable chick embryos from the incubating device, and then
   f) moving the one of the hatchable female batch portion and the hatchable male batch portion from the incubating device to a hatching device and hatching the one of the hatchable female batch portion and the hatchable male batch portion in the hatching device until hatching occurs; and
   g) administering feed to hatched chicks in the hatching device.

2. The method according to claim 1, wherein during step e) the incubating device is configured for 100% capacity utilization.

3. The method according to claim 1, comprising executing step a) in a first incubating device and step e) in a second incubating device different from the first.

4. The method according to claim 1, comprising buffering at least a portion of the batch of eggs between step a) and step e) wherein a lead time between step a) and e) is predetermined.

5. The method according to claim 1, comprising rearing the newly hatched chicks in the hatching device during an initial rearing period of between 0 to 4 days.

6. The method according to claim 1, wherein the detecting the presence of a hatchable chick embryo comprises one or more of heartbeat detection with respect to an egg, candling of an egg, thermal imaging of an egg, colour measurement of an egg, weighing of an egg, detecting activity in an egg, and sample analysis.

7. The method according to claim 1, comprising processing at least one of the hatchable female batch portion and the hatchable male batch portion into a high protein food product.

8. The method according to claim 7, comprising at the hatchery processing the at least one of the hatchable female batch portion and the hatchable male batch portion into the high protein product and administering the high protein product to hatched chicks in the hatching device.

9. A system for producing chicks according to the method of claim 1, the system comprising:
   a first incubating device and a second incubating device different from the first incubating device, wherein a capacity of the second incubating device is about half of a capacity of the first incubating device;
   wherein at least the second incubating device comprises a hatching tray comprising a number of egg accommodation spaces in which space an egg is able to be hatched, and at least one passage for a chick through which passage a chick hatched from said egg is able to pass through the tray and enter a chick basket below the tray.

10. A hatchery for producing chicks according to the method of claim 1, the hatchery comprising;
    a system for producing chicks comprising a first incubating device and a second incubating device different from the first incubating device, wherein a capacity of the second incubating device is about half of a capacity of the first incubating device,
    a system for determining the gender of a chick embryo,
    an egg handling system to redistribute at least one of the hatchable male batch portion and the hatchable female batch portion over incubating trays or hatching trays,
    an hatching device for hatching the at least one of the hatchable male batch portion and the hatchable female batch portion, and
    a feeding system to administer feed in the hatching device.

11. The method according to claim 1, wherein step d) comprises placing the at least one of the hatchable female batch portion and the hatchable male batch portion in a hatching tray different from the incubating tray and wherein step e) comprises incubating the at least one of the hatchable female batch portion and the hatchable male batch portion in the hatching tray.

12. The method according to claim 11, wherein the hatching tray is completely filled with the at least one of the hatchable female batch portion and the hatchable male batch portion.

13. The method according to claim 11, wherein the hatching tray comprises a number of egg accommodation spaces in which space an egg is able to be hatched, and at least one passage for a chick through which passage a chick hatched from said egg is able to pass through the tray and enter a chick basket below the tray, and the method comprises forming an assembly of the tray arranged on the basket and step f) comprises administering feed to hatched chicks in the basket.

14. The method according to claim 13, wherein the assembly of the tray arranged on the basket comprises one or more of a chick accommodation space, an access to the chick accommodation space, and a food trough.

15. The method according to claim 13, wherein the method comprises forming a stack of a number of assemblies of the tray arranged on the basket.

* * * * *